(12) United States Patent
Roskind et al.

(10) Patent No.: US 9,231,873 B1
(45) Date of Patent: ***Jan. 5, 2016

(54) SYSTEM AND METHOD FOR REDUCING LATENCY VIA CLIENT SIDE DYNAMIC ACKNOWLEDGEMENTS

(71) Applicant: Google Inc., Mountain View, CA (US)

(72) Inventors: James Roskind, Redwood City, CA (US); Michael A. Belshe, Saratoga, CA (US)

(73) Assignee: Google Inc., Mountain View, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 14/041,096

(22) Filed: Sep. 30, 2013

Related U.S. Application Data

(63) Continuation of application No. 12/892,119, filed on Sep. 28, 2010, now Pat. No. 8,576,711.

(51) Int. Cl.
*H04L 12/801* (2013.01)
*H04L 29/06* (2006.01)

(52) U.S. Cl.
CPC .............. *H04L 47/18* (2013.01); *H04L 47/19* (2013.01); *H04L 69/163* (2013.01)

(58) Field of Classification Search
None
See application file for complete search history.

(56) References Cited

U.S. PATENT DOCUMENTS

| | | |
|---|---|---|
| 5,961,605 A | 10/1999 | Deng et al. |
| 6,205,120 B1 | 3/2001 | Packer et al. |
| 6,208,620 B1 | 3/2001 | Sen et al. |
| 6,215,769 B1 | 4/2001 | Ghani et al. |
| 6,219,713 B1 | 4/2001 | Ruutu et al. |
| 6,252,851 B1 | 6/2001 | Siu et al. |
| 6,341,129 B1 | 1/2002 | Schroeder et al. |
| 6,446,121 B1 | 9/2002 | Shah et al. |
| 6,622,172 B1 | 9/2003 | Tam |
| 6,646,987 B1 | 11/2003 | Qaddoura |
| 6,788,704 B1 | 9/2004 | Lindsay |
| 6,925,060 B2 | 8/2005 | Mangin |
| 6,958,997 B1 | 10/2005 | Bolton |
| 7,142,536 B1 | 11/2006 | Gossett et al. |
| 7,174,386 B2 | 2/2007 | Cunningham et al. |
| 7,185,099 B1 | 2/2007 | Block |
| 7,225,266 B2 * | 5/2007 | Ameigeiras et al. .......... 709/235 |
| 7,236,459 B1 | 6/2007 | Okholm et al. |
| 7,304,975 B2 * | 12/2007 | Shvodian ...................... 370/338 |
| 7,444,443 B2 | 10/2008 | Sharma et al. |

(Continued)

OTHER PUBLICATIONS

Allman et al., Ongoing TCP Research Related to Satellites, IETF,RFC 2760, Feb. 2000.

(Continued)

*Primary Examiner* — Timothy J Weidner
(74) *Attorney, Agent, or Firm* — Lerner, David, Littenberg, Krumholz & Mentlik, LLP

(57) ABSTRACT

Systems and methods are provided whereby latency between a sending device and a receiving device during network communications is reduced by adaptively and dynamically acknowledging the reception of each of a determined number of packets that are transmitted by the sending device to the receiving device over the network. In one aspect, the receiving device adaptively and dynamically acknowledges the reception of each data packet as it is received from the sending device. In another aspect, the receiving device adaptively and dynamically acknowledges the reception of a group of at least two packets as the remaining data packets are received from the sending device.

16 Claims, 6 Drawing Sheets

(56) References Cited

U.S. PATENT DOCUMENTS

| | | | |
|---|---|---|---|
| 7,623,546 | B1 | 11/2009 | Bashyam et al. |
| 8,576,711 | B1 * | 11/2013 | Roskind et al. ............... 370/231 |
| 2002/0112057 | A1 | 8/2002 | Srinivas et al. |
| 2002/0159396 | A1 * | 10/2002 | Carlson et al. ................ 370/252 |
| 2004/0128346 | A1 | 7/2004 | Melamed et al. |
| 2005/0228896 | A1 * | 10/2005 | Nishida ......................... 709/230 |
| 2006/0195753 | A1 | 8/2006 | Nam et al. |
| 2007/0079208 | A1 | 4/2007 | Shvodian |
| 2007/0180169 | A1 * | 8/2007 | Mizuno et al. .................. 710/74 |
| 2007/0223492 | A1 | 9/2007 | Lee et al. |
| 2007/0239889 | A1 | 10/2007 | Mochida et al. |
| 2007/0286077 | A1 | 12/2007 | Wu |
| 2008/0075000 | A1 | 3/2008 | Robbins |
| 2008/0089230 | A1 | 4/2008 | Kootstra |
| 2008/0126663 | A1 * | 5/2008 | Murakami et al. ............ 710/311 |
| 2008/0291911 | A1 | 11/2008 | Lee et al. |
| 2009/0147734 | A1 * | 6/2009 | Naka et al. .................... 370/329 |
| 2011/0173312 | A1 | 7/2011 | Robin |
| 2011/0211449 | A1 | 9/2011 | Attar et al. |

OTHER PUBLICATIONS

Allman et al., TCP Congestion Control, IETF, RFC 2581, Apr. 1999.
Allman et al., TCP Congestion Control, IETF, RFC 5681, Sep. 2009.
Braden, Requirements for Internet Hosts—Communication Layers, IETF, RFC 1122, Oct. 1989.
Clark, Window and Acknowledgement Strategy in TCP, IETF, RFC 813, Jul. 1982.
Huston, TCP—How it works, The ISP Column (2004).
Paxson et al., RFC 2581—TCP Congestion Control, http://www.opalsoft.net/qos/TCP-1010.htm (2009).

* cited by examiner

SYSTEM AND METHOD FOR REDUCING LATENCY VIA CLIENT SIDE DYNAMIC ACKNOWLEDGEMENTS

CROSS-REFERENCE TO RELATED APPLICATIONS

The present application is a continuation of U.S. patent application Ser. No. 12/892,119, filed Sep. 28, 2010, the disclosure of which is incorporated herein by reference.

BACKGROUND OF THE INVENTION

The Internet protocol suite is a well known and widely used suite of protocols for servicing data transmissions between two devices communicating information over the Internet. In particular, the Transmission Control Protocol ("TCP") is a part of the Internet protocol suite that provides for connection-oriented, reliable, and ordered delivery of a stream of information (i.e., payload data) between, for example, a web-browser application running on a client device and a web-server application running on a server device over a local or wide area network.

To communicate with a server device using the TCP protocol, a client device must first establish a TCP connection with the server. After a TCP connection is established, each device may transmit information to the other device in a sequence of discrete data packets, where each data packet contains a header portion and a data portion.

To ensure efficient communication, the TCP protocol incorporates several mechanisms that determine the amount of data (e.g., bytes) that may be transmitted in a single data packet, the flow or rate at which multiple packets are exchanged between the devices, and the effect of the packet transmissions on overall network congestion.

For example, the maximum amount of payload data that a sending device may transmit in the data portion of a single data packet to a receiving device is governed by the maximum segment size ("MSS") value. Once the MSS value is established, a sending device may not transmit a data packet where the data portion of the packet contains an amount of payload data exceeding the MSS value of the receiving device.

Another mechanism to ensure reliable communication between two devices communicating over the network in accordance with the protocol is the acknowledgement mechanism, where each device acknowledges the reception of data received from the other device. For efficiency and in order to reduce network congestion, the receiving device typically does not send a separate acknowledgement for each data packet that it receives from the sending device. Rather, the acknowledgement mechanism of the TCP protocol is conventionally implemented such that the receiving device will delay transmitting an acknowledgment until it receives at least two data packets from the sending device. The delayed acknowledgement, when transmitted, typically acknowledges the reception of the data contained in two consecutive packets.

If the data acknowledged by the receiving device does not match the data that was transmitted (for example, if the receiving device only acknowledges the data in one packet when two data packets were transmitted by the server), the sending device retransmits the unacknowledged data packet to the receiving device, until all transmitted data is successfully acknowledged by the receiving device. Furthermore, if the sending device does not receive an acknowledgement within a prescribed period of time (because, for example, the client's acknowledgement packet is lost in transmission, or because none of the data packets transmitted by the server were received at the client device), the sending device retransmits unacknowledged data packets to the receiving device after waiting for an acknowledgement for a prescribed amount of time.

A mechanism known as the congestion window ("CW") is another aspect of the TCP protocol that is designed to increase efficiency. Rather than defining the maximum size of the packet, the CW defines the maximum amount of data that a sending device (e.g., a server) may transmit at any given time to a receiving device (e.g., a client) before having to wait for an authorization from the receiving device to send more. In this regard, the CW comprises the maximum number of unacknowledged packets that a sending device may transmit to a receiving device in series prior to having to wait for an acknowledgement from the receiving device, where the maximum amount of data contained in each of the transmitted packets is based upon the MSS value of the receiving device.

In particular, some conventional implementations of the TCP/IP protocol set the CW to an initial default value of two (2) packets. Thus, a sending device may initially send two unacknowledged data packets to a receiving device and then must wait for an acknowledgement of those packets prior to sending any remaining packets. Upon receiving an acknowledgement for the initial two packets, the sending device may increase the value of CW and transmit a greater number of the remaining packets in series prior to having to again wait for another acknowledgement from the receiving device.

The value of CW is typically increased by the number of packets that are acknowledged. Thus, for example, once the server receives an acknowledgement indicating the reception of the initial two packets, the server may increase the initial CW value (2 packets) by the number of acknowledged packets (2 packets), resulting in a new CW value of four (4) packets. Consequently, the server may now transmit four packets in a sequence to the client prior to having to wait for another acknowledgment.

The process of increasing the value of CW by the number of the acknowledged packets can theoretically continue indefinitely, until all available payload data has been successfully transmitted from the sending device to the receiving device. In the event that the sending device determines that one or more transmitted packets have been lost (i.e., because the transmitted packets have not been acknowledged by the receiving device within a prescribed period of time or because a negative acknowledgement is received), the value of CW is conventionally reduced by half (attributing the loss to congestion on the network) and the unacknowledged packets are retransmitted by the sending device in accordance with the reduced value of CW.

BRIEF SUMMARY OF THE INVENTION

In one aspect, a system for transmitting acknowledgment packets over a network is provided. The system includes a first network device and a second network device interconnected via the network, a memory storing instructions, and a processor to execute the instructions. The instructions include adaptively determining, with the processor, a first number of acknowledgements to be transmitted from the first network device to the second network device based on a predetermined criterion; receiving, at the first network device, a first set of data packets transmitted by the second network device to the first network device over a first network connection; and, dynamically transmitting, based on the adaptively determined first number of acknowledgments, a first set of acknowledgement packets from the first network device to the second network device over the first network connection, where each acknowledgment packet in the dynamically transmitted first set of acknowledgement packets individually and immediately acknowledges reception of a respective data packet as each data packet in the first set of data packets is received at the receiving device via the first network connection.

In another aspect, a method of transmitting acknowledgment packets over a network is provided. The method includes adaptively determining, with a processor at a receiving device, a first number of acknowledgements to be transmitted from the receiving device to a sending device based on a predetermined criterion; receiving, at the receiving device, a first set of data packets transmitted by the sending device over a first network connection; and, dynamically transmitting, based on the adaptively determined first number of acknowledgments, a first set of acknowledgement packets from the receiving device to the sending device over the first network connection, where each acknowledgment packet in the dynamically transmitted first set of acknowledgement packets individually and immediately acknowledges reception of a respective data packet as each data packet in the first set of data packets is received at the receiving device.

BRIEF DESCRIPTION OF THE DRAWINGS

Other objects and advantages of the present invention will be apparent from the following detailed description of the present embodiments, which description should be considered in conjunction with the accompanying drawings in which like reference numbers indicate similar elements and in which.

DETAILED DESCRIPTION

Systems and methods are provided whereby latency between a sending device and a receiving device, such as but not limited to a server and a client exchanging information via an established connection over a network, is reduced by adaptively and dynamically acknowledging the reception of each of a determined number of packets that are transmitted by the sending device to the receiving device over the network. Latency may be reduced by adaptively and individually acknowledging one or more data packets as each respective data packet is received at the receiving device, thus preventing a stall in the value of CW at the sending device caused by certain network conditions.

Figure 1:
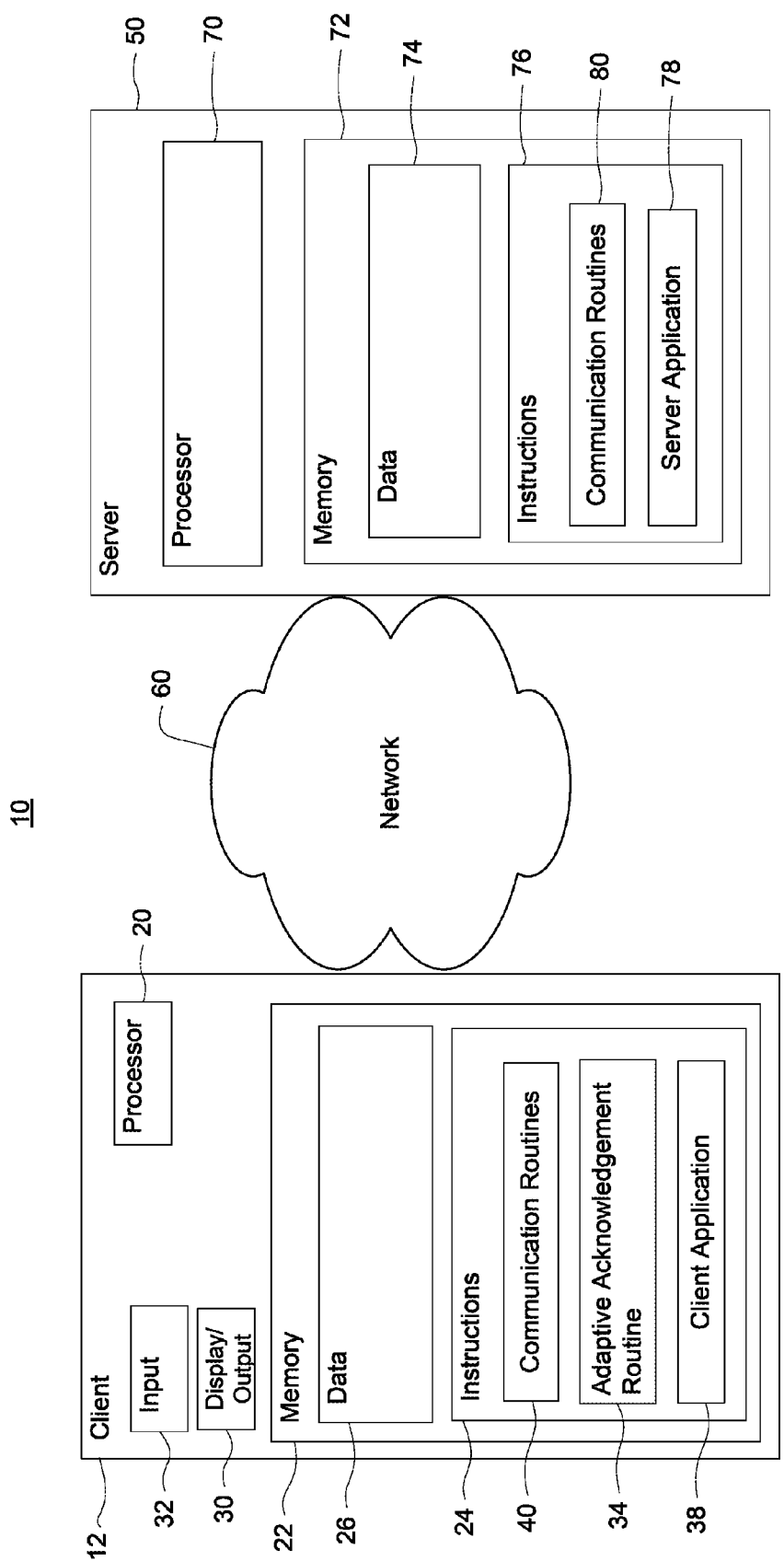
FIG. 1 is a block diagram of an exemplary embodiment in accordance with one aspect of the invention.
Figure 2:
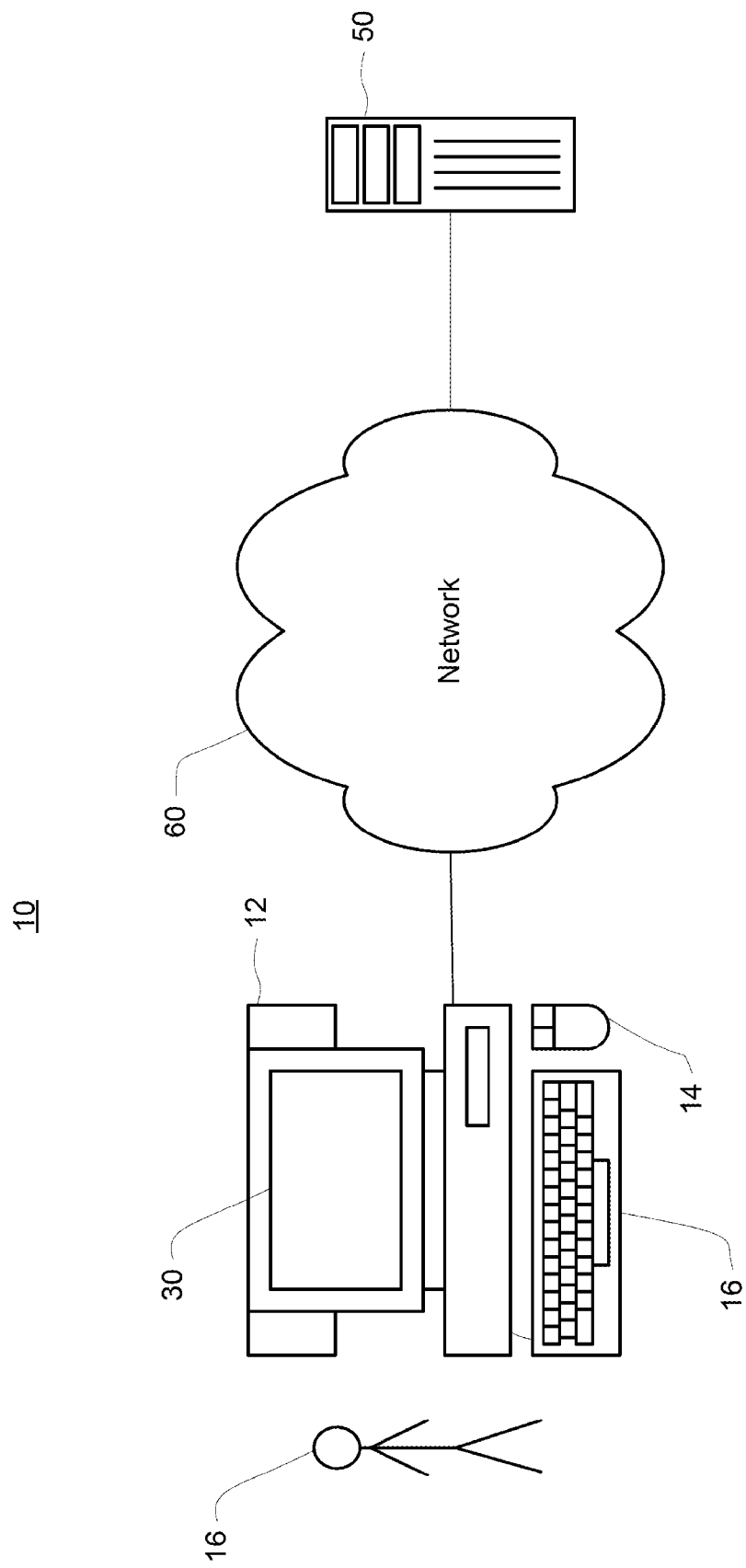
FIG. 2 is a hardware diagram of the system illustrated in FIG. 1 in accordance with an aspect of the present invention.

As shown in FIGS. 1-2, a communication system 10 in accordance with one aspect of the invention may provide for exchange of data between a client computer 12 and a server computer 50 over a communication network 60. The client computer 12 contains a processor 20, memory 22 and other components typically present in general purpose computers. In addition, the server 50 contains a processor 70 and a memory 72.

The memory 22 stores information accessible by the processor 20, including instructions 24 that may be executed by the processor 20 and data 26 that may be retrieved, manipulated or stored by the processor 20. Similarly, the memory 72 stores information accessible by processor 70, including instructions 76 that may be executed by the processor 70 and data 74 that may be retrieved, manipulated or stored by the processor 70. The memory may be of any type capable of storing information accessible by the processor, such as a hard-drive, memory card, ROM, RAM, DVD, CD-ROM, write-capable memory, read-only memories, etc.

The processors 20, 70 may comprise any number of well known processors, such as processors from Intel Corporation. Alternatively, the processors may be dedicated controllers such as an ASIC.

The instructions 24, 76 may comprise any set of instructions to be executed directly (such as machine code) or indirectly (such as scripts) by the processors 20, 70, respectively. In that regard, the terms "instructions," "steps" and "programs" may be used interchangeably herein. The instructions may be stored in object code form for direct processing by the processor, or in any other computer language including scripts or collections of independent source code modules that are interpreted on demand or compiled in advance. The functions, methods and routines of instructions in accordance with the invention are explained in more detail below.

The data 26, 74 may be retrieved, stored or modified by the processors 20, 70 in accordance with the instructions 24, 76, respectively. The data may be stored as a collection of data. Moreover, the data may comprise any information sufficient to identify the relevant information, such as descriptive text, proprietary codes, pointers, references to data stored in other memories (including other network locations) or information which is used by a function to calculate the relevant data.

Although the processor and memory for the client 12 and server 50, respectively, are functionally illustrated in FIG. 1 as being within the same block, each processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor 20 or 70 may actually comprise a collection of processors which may or may not operate in parallel.

In one embodiment, the client computer 12 may be a general purpose computer, intended for use by a person, having all the internal components normally found in a personal computer such as a central processing unit (CPU), display 30, input 32 such as a CD-ROM drive, mouse, keyboard or microphone, and a hard-drive, speakers, modem and all of the components used for connecting these elements to one another. Moreover, computers 12 and 50 in accordance with the systems and methods described herein may comprise any device capable of processing instructions and transmitting data to and from humans and other computers, including network computers lacking local storage capability, PDAs with modems and Internet-capable wireless phones. Although the input means shown in FIG. 1 are a mouse and keyboard, other means for inputting information from a human into a computer are also acceptable such as a microphone, touch-sensitive screen, voice recognition, position or orientation sensitive devices including accelerometers, etc.

The server 50 and the client computer 12 are capable of direct and indirect communication, such as over the network 60. Although only a single client computer and a single server are depicted in FIGS. 1 and 2, it should be appreciated that a typical system can include a large number of connected computers and several servers to which the computers can connect, with each different computer being at a different node of the network. The network, and intervening nodes, may comprise various configurations and protocols including the Internet, intranets, virtual private networks, wide area networks, local networks, private networks using communication protocols proprietary to one or more companies, Ethernet, WiFi and HTTP. Such communication may be facilitated by any device capable of transmitting data to and from other computers, such as modems (e.g., dial-up or cable), networks cards and wireless interfaces.

In accordance with one aspect of the invention, instructions 76 in server 50 may include a server application 78 and communication routines 80. The server application 78 may be a web-server application that receives search queries and generates search results in response, such as the search results provided by Google.com. While particularly advantageous when used in connection with web-server applications, it will be understood that the system and method is not limited to any particular server application.

The communication routines 80 assist in the receipt and transmission of the information, such as placing the results generated by the server application 78 into the payload data portion of a data packet and transmitting the results to a client application running on the client device in accordance with one or more networking protocols, such as the TCP/IP protocol. In this regard, the functions of sending, receiving and processing the TCP/IP packets may be accomplished using communication routines provided by operating systems such as Linux and Microsoft Windows.

Data 74 in the server 50 may include any data, such as data received from client 12 over network 60. For example, the data received from client 12 may include a search request that is input by a user into a web-browser application running on the client device and directed to the web-server application running on the server device.

Data 74 may also include data to be transmitted from the server device 50 to the client device 12 over network 60. The data to be transmitted from the server to the client may include payload data that is generated by the web-server application in response to the search request. The payload data may include, for example, one or more HTML web-pages that include formatting data and search results data generated by the web-server application in response to the search request from the client device.

Instructions 24 in client 12 may include a client application such as the web-browser application 38 and communication routines 40. The web-browser application 38 may communicate a search request, input by a user into the web-browser and directed to the web-server application running on the server, to the communication routines 40, which may service data transmissions between client 12 and server 50 and transmit the search request to the server device in accordance with the one or more networking protocols, such as, for example, the TCP/IP protocol. The web-browser application may also format and display, to the user, the payload data received from the server in response to the search request, as part of one or more web-pages.

The communication routines 40 assist in the receipt and transmission of the information from the client device to the server device in accordance with one or more network protocols. For example, the communication routines 40 may place the search request into the data portions of one or more data packets and transmit the packets to the search engine application running on the server device in accordance with the TCP/IP communication protocol. In this regard, the functions of sending, receiving and processing the TCP/IP packets may be accomplished using communication routines provided by operating systems such as Linux and Microsoft Windows.

Data 26 in the client 12 may include any data that is transmitted or received by the client device over the network. For example, data 26 may include a request for information or an acknowledgement to be transmitted over the network to a network device such as the server 50, and may also include data that is received at the client device from a network device in response to a request, such as payload data received from server 50 in response the client's request.

In addition, the instructions 24 may also include an adaptive acknowledgement routine 34. The adaptive acknowledgement routine 34 may include functionality at an application level that modifies, supplants, or supplements a portion of the network protocol functionality provided by the communications routines 40 and the web-browser application 38. In this regard, the adaptive acknowledgement routine 34 may include functionality for dynamically acknowledging, in accordance with one or more network protocols, one or more number of data packets as they are received by the client 12 over the network 60 as described in detail below. The adaptive acknowledgement routine 34 may be implemented as a standalone routine, or may be integrated with functionality provided by other routines such as the communication routines 40 or the web-browser application 38. In addition, the functionality of the adaptive acknowledgement routine may be implemented using software, hardware, or a combination of both.

It should be understood that the procedures and operations described herein do not have to be performed in the precise order described below. Rather, various steps may be handled in reverse order or simultaneously unless otherwise stated herein.

Figure 3:
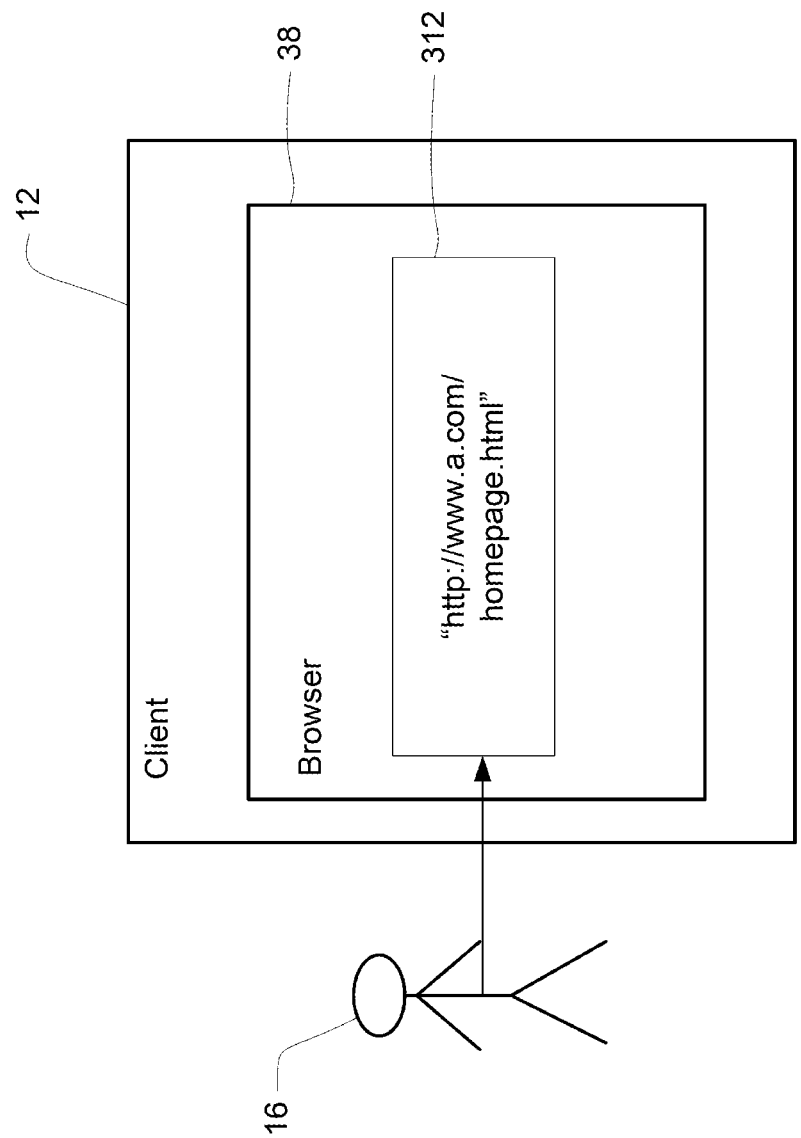
FIGS. 3-5 illustrate an exemplary operation in accordance with aspects of the invention.

As shown in FIG. 3, in one aspect a user 16 at client device 12 may request a desired resource (e.g., web-page) by entering a URL 312 into a client application 38 such as a web browser. The web-browser application 38 may parse the URL 312 to identify the desired resource, its network location, and one or more network protocols via which the desired resource may be obtained over the network. For example, the web-browser application 38 may parse URL 312 and determine that the resource desired by the user is a web-page "homepage.html" which may be obtained using the HTTP protocol from a server associated with the host name "www.a.com".

In order to service the user's request, the web-browser application 38 may establish a network connection to the server device hosting the desired resource, and subsequently request the desired resource over the established connection in accordance with one or more conventional networking protocols. For example, the web-browser application 38 may establish, in accordance with the TCP/IP protocol, a TCP/IP network connection between the client device and the server device by resolving host name into an IP address of the server. The web-browser application may then transmit, over the established connection and in accordance with conventional TCP/IP protocol, one or more TCP/IP data packets to the server, where the transmitted packets include an HTTP request for the web-page "homepage.html" desired by the user.

Figure 4:
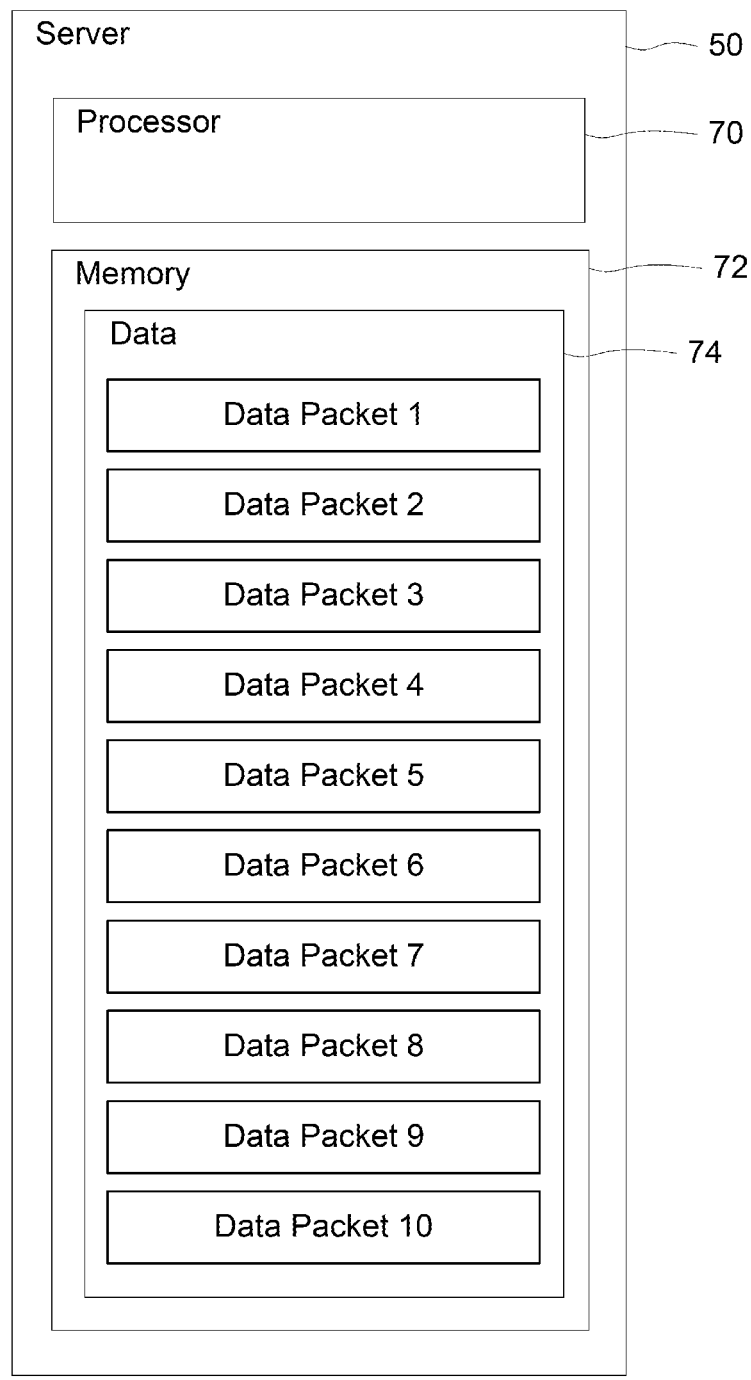

Upon receiving the client device's request for the desired web-page, the server device in turn may generate results responsive to the request and packetize the results into data packets for transmission back to the client device over the same network connection. As shown in FIG. 4, for example, the server may initially generate ten data packets in accordance with the TCP/IP protocol, where one or more of the data packets may contain the results (e.g., HTML data) responsive to the client's request and any other data associated with the results (e.g., advertisements or links to other web-pages the user may be interested in), to be transmitted over to the client device in accordance with the TCP/IP protocol.

As discussed above, however, certain networking protocols such as the TCP/IP protocol conventionally limit the number of data packets that may be transmitted over the network at a given time in order to reduce the amount of congestion in the network. For example, typical implementations of the CW mechanism in the TCP/IP protocol conventionally limit the initial number of unacknowledged data packets that a sending device may transmit in a series to a receiving device to two (2) packets (e.g., initial CW=2). Conversely, the receiving device conventionally waits for a period of time to receive at least two data packets before transmitting a single acknowledgement data packet to the sending device, where the single acknowledgement acknowledges the reception of both data packets. While limiting the transmitted number of unacknowledged data packets and acknowledgement packets can reduce the amount of congestion in the network, it can also increase latency measured from the perspective of a user that is waiting for the data at the receiving device in several cases.

One such case may occur when one or more of the unacknowledged data packets transmitted by the sending device are lost enroute to the receiving device. For example, consider the case where the sending device transmits two unacknowledged data packets in series to the receiving device, and one of the two transmitted packets is lost or delayed in the network while the other data packet is successfully received at the receiving device. In this case, the receiving device will conventionally wait for a prescribed period of time (typically at least 200 ms) to receive the second data packet, in order to be able to transmit a single acknowledgement packet that acknowledges the reception of both data packets. While the receiving device will eventually transmit an acknowledgement packet that acknowledges the reception of only the first data packet after the expiration of the prescribed period of time (e.g., upon expiration of a timeout period), waiting for the second data packet until the timeout period expires can increase the latency measured from the user's perspective because the sending device cannot increase the value of CW and transmit additional packets until it receives an acknowledgement from the receiving device.

Another such case may occur even when the receiving device successfully receives all of the unacknowledged data packets that are transmitted in series by the sending device, but where one or more acknowledgement packets that are transmitted by the receiving device back to the sending device are lost or delayed in the network. As in the example above, consider the case where the sending device transmits two data packets in series to the receiving device (CW=2), where the receiving device successfully receives both packets and transmits a single acknowledgement packet in response, which is lost or delayed in the network.

Latency may also increase in this case, because, as before, the sending device cannot increase the value of CW and transmit additional packets until it receives the lost or delayed acknowledgement from the receiving device. Typically, if the acknowledgement packet is not received by the sending device within a prescribed period of time (e.g., a timeout period), the sending device will retransmit the previously transmitted packets to the receiving device and again wait for a prescribed amount of time for an acknowledgement from the receiving device, which can, in turn, potentially increase latency even more in certain network conditions.

In view of the foregoing, it is often desirable to facilitate faster enlargement of the CW at the sending device, which may, in some cases, not only prevent a stall in the transmission of additional data packets at the sending device, but also may reduce the latency measured from a user's perspective because the additional data packets may be received at the receiving device earlier than they would be otherwise. Thus, according to one aspect, the receiving device may facilitate enlargement of the CW at the sending device by adaptively and dynamically acknowledging one or more data packets immediately as each data packet is received (e.g., without waiting to receive any additional packets or for any timeout period to expire) from the sending device over a network connection. In cases such as those discussed above, dynamically and immediately acknowledging one or more packets as each packet is received may increase the likelihood that the sending device will receive an acknowledgement for at least one or more of the transmitted data packets, thus allowing the sending device to enlarge the CW and to transmit additional data packets earlier than it would be able to otherwise.

Figure 5:
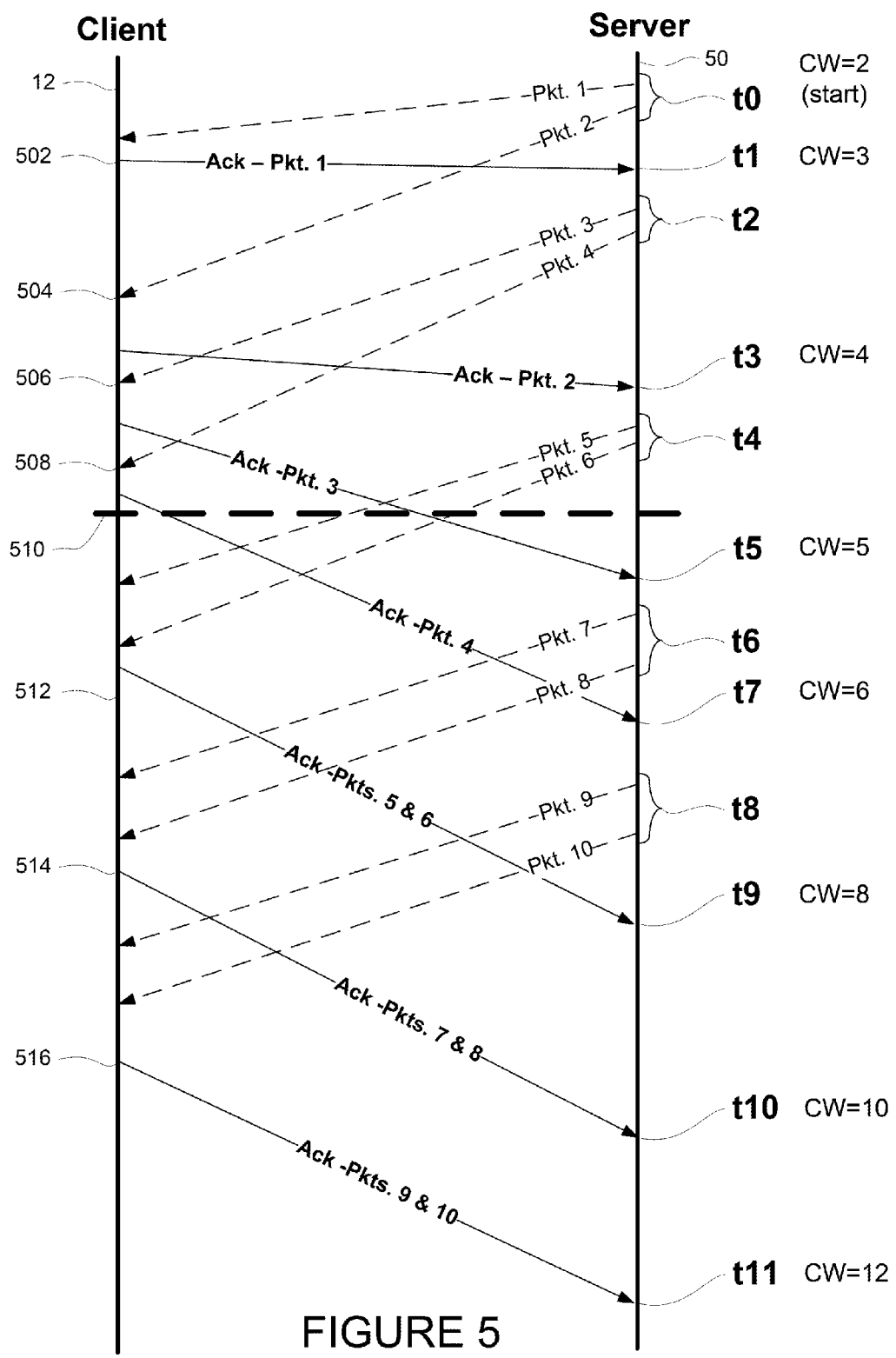

Returning to the exemplary embodiment, this aspect is illustrated in FIG. 5. As shown therein, upon generating the results contained in data packets responsive to the client device's request (FIGS. 3-4), the server device may begin transmitting the packetized results to the client device over the network connection in accordance with the TCP/IP protocol.

Assuming that the initial value of CW for the connection is set to the conventional value of two packets at the server device (CW=2 at start), the server may only transmit, at time t0, two data packets, Pkt.1 and Pkt.2 to the client device in a first series. The server must then wait to receive an acknowledgment from the client device before it can transmit any of the remaining packets (Pkts. 3-10).

At the client device, adaptive acknowledgement routine 34 may dynamically and immediately acknowledge Ptk.1 and Pkt.2 as each data packet is received over the network, that is, without waiting to receive any other packet or waiting for a timeout period to expire. As illustrated in FIG. 5, for example, the client device may receive data packet Pkt.1 before it receives Pkt.2. Upon receiving Pkt.1, the adaptive acknowledgement routine may transmit an acknowledgement packet 502 for Pkt.1 without waiting to receive Pkt.2 for any conventional amount of time, which may reduce latency in the event that Pkt.2 is lost or delayed enroute to the client. Acknowledgement packet 502 (Ack-Pkt.1) identifying reception of Pkt.1 may be received by the server device at time t1, which, in turn enables the server device to increase the CW value by one packet to a total of three packets (CW=3) and thus transmit two additional data packets (Pkts.3-4 at time t2) to the client device in a second series. As can be seen, adaptively acknowledging Pkt.1 individually as described above allows the server to transmit additional packets earlier (at time t2) to the client in the case that Pkt.2 is lost or delayed in the network and, as a result, has not even been received at the client device at the time the additional packets are transmitted.

The adaptive routine 34 at the client device may continue to adaptively acknowledge each data packet as it is received until the adaptive routine determines that the congestion window at the server device is sufficiently increased as a result of such operation. For example, and as shown in FIG. 5, the client device may eventually receive the second packet (Pkt.2) after it has already transmitted an acknowledgement for the first packet (Pkt.1). As before, the adaptive routine 34 at the client device may transmit an acknowledgement 504 (Ack-Pkt.2) that individually and immediately acknowledges the reception of Pkt.2 without waiting to receive any additional packets or waiting for any timeout period to expire.

Similarly, the adaptive routine may also individually acknowledge data packets Pkt.3 and Pkt.4 (indicated by reference numbers 506, 508, respectively) as each data packet is received at the client device. In effect, transmitting an acknowledgement as each packet is received at the client device instead of waiting to receive at least two packets prior to transmitting a single acknowledgement for both packets increases the number of acknowledgments that are transmitted from the client device to the server. Since a greater number of acknowledgements are transmitted, the likelihood that the server will experience a stall in the transmission of additional packets caused by the loss of an acknowledgement packet in the network may be greatly reduced, which in turn, may reduce the latency that a user may experience while waiting for the data desired from the server device.

The server 50 may likewise continue to receive one or more acknowledgements from the client device 12 and increase the value of CW and immediately transmit additional packets as each acknowledgement is received. As shown in FIG. 5, the server 50 may continue to receive acknowledgements 504, 506 and 508 at times t3, t5, and t7, respectively, which may enable the server to increase the value of the CW as each acknowledgement is received and transmit additional packets (Pkt.5-Pkt.10) to the client device at times t4, t6, and t7 in the manner described above.

After adaptively acknowledging a number of data packets immediately as each data packet is received via the network connection from the server, the adaptive routine at the client device may adaptively determine that the CW value at the server device has now been sufficiently enlarged such that fewer acknowledgements may be transmitted in response to the reception of the remaining data packets. Upon such determination, instead of acknowledging each remaining data packet as it is received, the adaptive routine may now dynamically transmit a single acknowledgement that acknowledges the reception of at least two data packets as each of the remaining data packets are received over the same network connection.

This aspect of the system and method is illustrated by dashed line 510 in FIG. 5, where the client device, after acknowledging each of the first four data packets (Pkt.1-Pkt.4) individually, subsequently dynamically transmits fewer acknowledgments in response to reception of the remaining data packets (Pkt.5-Pkt.10) from the server device over the same network connection. Thus, as illustrated in FIG. 5, adaptive routine 34 dynamically transmits a single acknowledgement 512 to acknowledge the reception of both data packets Pkt.5 and Pkt.6 from the server over the same network connection. Similarly, the adaptive routine dynamically transmits acknowledgements 514 and 516 in response to receiving each pair of data packets Pkt.7-Pkt.8 and Pkt.9-Pkt.10 respectively.

At the other end, the server 50, upon receiving acknowledgements 512 (at t9), 514 (at t10), and 516 (at t11), may now increase the value of CW by two packets (instead of one) as each acknowledgment that acknowledges the data in two packets is received, and may thus continue to transmit new data packets as they become available, where, for example, the new data packets may include additional search results that were generated by the web-server application at the server device in the meantime.

The exemplary operation described with respect to FIG. 5 provides multiple benefits. First, and as discussed previously, adaptively and dynamically acknowledging each data packet as it is received (e.g., without waiting to receive any other packets or waiting for a period of time to expire) reduces latency measured from a user's perspective by enabling the sending device to increase its CW value and transmit additional packets earlier than it could otherwise. The reduction in latency realized may be even greater during short transmissions, e.g., transmissions where the total number of packets that are transmitted by the sending device in response to a user's request is small (e.g., around 5-20 packets). In such cases, adaptively acknowledging a few initial data packets as each data packet received from the server may sufficiently enlarge the CW value such that the server device is then able to transmit all of the remaining packets in a single series without having to wait for additional acknowledgements. Second, dynamically transmitting fewer acknowledgments over the same connection to the server for the remaining data packets advantageously reduces traffic in a congested network, thus potentially using the network bandwidth more efficiently.

The number of data packets that are dynamically acknowledged by the receiving device may be adaptively determined in several ways based upon one or more criteria. In one aspect, data packets received from a sending device may be dynamically acknowledged based upon average number of data packets received over distinct network connections from one or more sending devices in response to prior requests that are similar or identical to the type of the most recent request. By way of example, the adaptive routine at the client device may determine, based upon an analysis of previous responses from one or more servers to similar or identical type of requests, that the average number of packets received in response to such requests is around sixteen packets. Based upon such adaptive determination, the adaptive routine may dynamically acknowledge one-quarter, one-half, or any other lesser number of packets as each packet is received from a server, while thereafter dynamically transmitting a single acknowledgement for a group of two or more of the remaining packets as they are received from the server over the same connection in the manner described above.

In another aspect, data packets may be dynamically acknowledged not based upon average number of expected data packets from one or more sending devices, but instead based upon the identity and/or location of a particular sending device. In accordance with this aspect, for example, the adaptive acknowledgement routine at the client device may adaptively transmit a single acknowledgement for every packet as it is received over a first network connection from a first server located at a first geographical location (e.g., within 200 miles of the receiving device), while also adaptively transmitting a single acknowledgement for a group of two or more packets as they are received over a second connection from a second server located at a second geographical location (e.g., over 500 miles away from the receiving device).

In a yet another aspect, the number of data packets that are adaptively and dynamically acknowledged as each data packet is received may be determined based upon the estimated network congestion between the receiving device and one or more sending devices. In accordance with this aspect, for example, the adaptive acknowledgment routine may dynamically transmit an acknowledgement for each data packet as it is received from one or all servers during estimated periods of low or moderate network congestion (e.g., low or moderate round trip time ("RTT")), while dynamically acknowledging a group of two or more packets as they are received from one or more servers during estimated periods of high network congestion (e.g., high RTT).

In a still further aspect, the number of data packets that are adaptively and dynamically acknowledged may be determined based upon a combination of one or more of the above. In accordance with this aspect, a receiving device may dynamically acknowledge data packets as they are received based upon an adaptive determination based upon a combination of the type of request, the number of data packets expected in response, the identity of the server from which the packets are received, and the estimated degree of network congestion.

In a yet another aspect, the adaptive routine may continue to determine and dynamically transmit acknowledgments during communications between a sending and a receiving device, and adaptively modify the number of acknowledgments that are transmitted based on changed conditions. For example, the adaptive routine may initially determine and begin transmitting a first number of acknowledgement packets based upon the type of request transmitted to the sending device as described above, where the transmitted acknowledgment packets may individually acknowledge each data packet as it is received at the receiving device. Periodically or continuously during such transmission, the adaptive routine may determine that the network conditions have changed such that the network congestion has significantly increased based on a calculated or estimated RTT between the receiving device and the sending device. Based upon such determination, the adaptive routine may adaptively transmit fewer subsequent acknowledgment packets to the sending device, where each subsequent acknowledgment packet acknowledges reception of data contained in at least two or more data packets received at the receiving device, which may thus help reduce or prevent further congestion of the network. Upon detecting that the network congestion has reduced to an acceptable level, the adaptive routine may then revert back to transmitting individual acknowledgment packets for each data packet as it is individually received at the receiving device in the manner described above.

Figure 6:
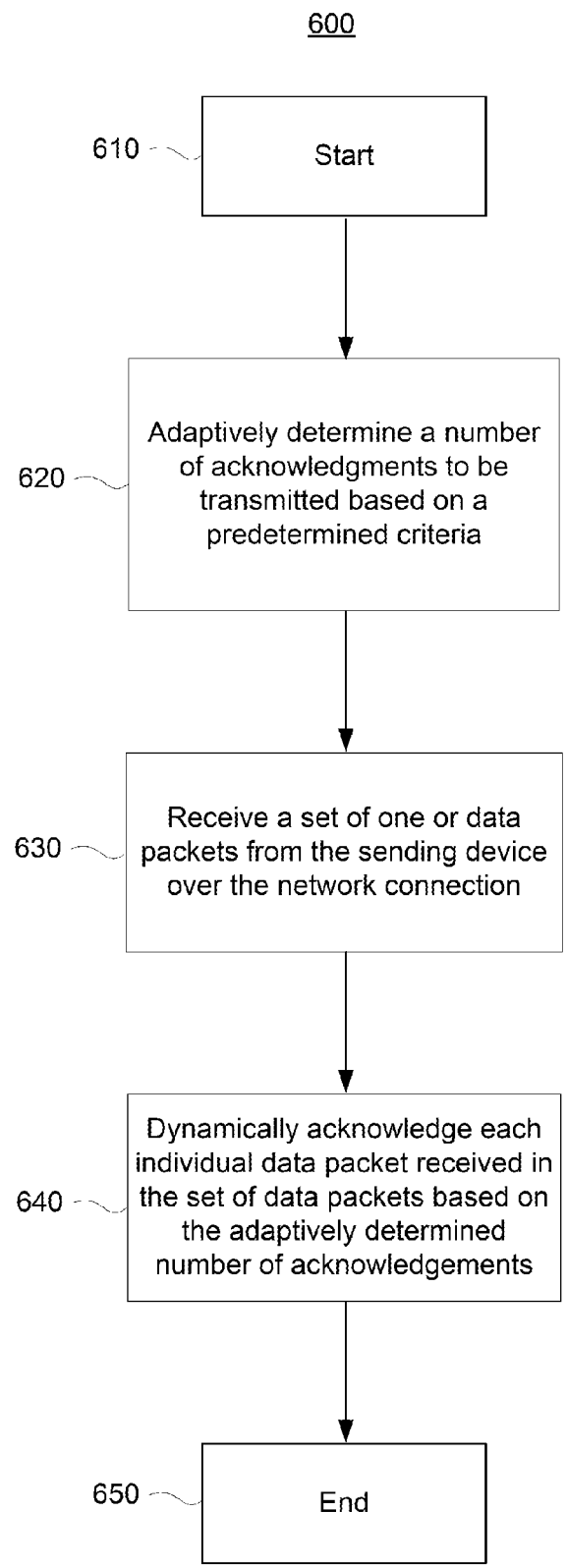
FIG. 6 is a flow diagram of a process in accordance with various aspects of the invention.

FIG. 6 is a flow chart of a process 600 in accordance with various aspects of the invention. It should be understood that the following operations do not have to be performed in the precise order described below. Rather, certain operations may occur in any order or simultaneously.

The process is initiated in block 610. In block 620, the process adaptively determines a number of acknowledgments to be dynamically transmitted from a receiving device to a sending device over the network. In one example, the number of acknowledgments may be adaptively determined based on an average number of data packets received at the receiving device in response to one or more previous requests transmitted to one or more sending devices. In another example, the number of acknowledgments may be determined based on the estimated congestion in the network connection between the receiving device and sending device. In yet another example, the number of acknowledgements may be adaptively determined based on the identity and/or location of the sending device. In a further example, the number of acknowledgements may periodically or continuously be determined based on a combination of the above.

In block 630, the process receives, over a network connection between the sending and the receiving device, one or more data packets transmitted by the sending device to the receiving device over a network. In one example, the data packets may be received at the receiving device where the received data packets contain all or a portion of data responsive to a recent or last request transmitted by the receiving device to the sending device over the same network connection.

In block 640, the process dynamically transmits acknowledgment packets from the receiving device to the sending device based on the adaptive determination in block 620.

The receiving device may dynamically transmit a first set of acknowledgment packets to the sending device over the network. Each transmitted acknowledgment packet in the first set of acknowledgement packets may respectively acknowledge a single data packet as it is received by the receiving device over the network. In other words, each acknowledgment packet in the first set of acknowledgment packets may be transmitted by the receiving device to the sending device in response to receiving a respective single data packet and without waiting to receive any additional packets.

Alternatively or in addition, the receiving device may transmit a second set of acknowledgment packets over the same network connection to the sending device based on the adaptive determination in block 620. In this regard, each acknowledgment packet transmitted in the second set of acknowledgment packets may acknowledge the reception of a group of at least two or more data packets as the remaining unacknowledged data packets are received at the receiving device over the network.

After all of the data packets received from the sending device over the network connection have been acknowledged in the manner described above, the process ends in block 650.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of transmitting acknowledgment packets over a network, the method comprising:
    adaptively determining, with a processor at a receiving device, a number of acknowledgements to be transmitted from the receiving device to a sending device based upon the geographic distance between the sending device and the receiving device and an analysis of a type of a request being transmitted by the receiving device to the sending device; and
    dynamically transmitting, based on the adaptively determined number of acknowledgments, a set of acknowledgement packets from the receiving device to the sending device,
    wherein each acknowledgment packet in the dynamically transmitted set of acknowledgement packets individually and immediately acknowledges reception of a corresponding data packet received at the receiving device from the sending device.

2. The method of claim 1, wherein adaptively determining the number of acknowledgements is based on a number of data packets expected in response to the request transmitted by the receiving device to the sending device.

3. The method of claim 1, wherein adaptively determining the number of acknowledgements is based on an identity of the sending device.

4. The method of claim 1, wherein adaptively determining the number of acknowledgements is based on estimated congestion in a network between the sending device and the receiving device.

5. The method of claim 1, further comprising:
    dynamically transmitting, based on the adaptively determined number of acknowledgments, a second set of acknowledgement packets from the receiving device to the sending device, wherein each acknowledgment packet in the second set respectively acknowledges reception of at least two data packets as remaining data packets are received at the receiving device from the sending device.

6. The method of claim 1, wherein the set of acknowledgement packets is dynamically transmitted in accordance with a TCP/IP protocol.

7. A system for transmitting acknowledgment packets over a network comprising a first network device and a second network device interconnected to the first network device via the network, the system comprising:
   a non-transitory memory storing instructions; and
   a processor configured to execute the instructions stored in the memory, wherein the instructions, when executed by the processor, cause the processor to:
   adaptively determine, with the processor, a number of acknowledgements to be transmitted from the first network device to the second network device based upon the geographic distance between the first network device and the second network device; and
   dynamically transmit, based on the adaptively determined number of acknowledgments, a set of acknowledgement packets from the first network device to the second network device,
   wherein each acknowledgment packet in the dynamically transmitted set of acknowledgement packets individually and immediately acknowledges reception of a corresponding data packet received at the first network device from the second device.

8. The system of claim 7, wherein adaptively determining the number of acknowledgements is based on a number of data packets expected in response to the request transmitted by the first network device to the second network device.

9. The system of claim 7, wherein adaptively determining the number of acknowledgements is based on an identity of the second network device.

10. The system of claim 7, wherein adaptively determining the number of acknowledgements is based on estimated congestion in a network connection interconnecting the first network device and the second network device.

11. The system of claim 7, wherein the instructions further cause the processor to:
   dynamically transmit, based on the adaptively determined number of acknowledgments, a second set of acknowledgement packets from the first network device to the second network device,
   wherein each acknowledgment packet in the second set respectively acknowledges reception of at least two data packets as remaining data packets are received at the first network device from the second network device.

12. The system of claim 7, wherein the set of acknowledgement packets is dynamically transmitted in accordance with a TCP/IP protocol.

13. A method of transmitting acknowledgment packets over a network, the method comprising:
   adaptively determining, with a processor at a receiving device, a number of acknowledgements to be transmitted from the receiving device to a sending device based upon the geographic distance between the sending device and the receiving device; and
   dynamically transmitting, based on the adaptively determined number of acknowledgments, a set of acknowledgement packets from the receiving device to the sending device,
   wherein each acknowledgment packet in the dynamically transmitted set of acknowledgement packets individually and immediately acknowledges reception of a corresponding data packet received at the receiving device from the sending device.

14. The method of claim 13, wherein adaptively determining the number of acknowledgements is based on a number of data packets expected in response to a request from the sending device.

15. The method of claim 13, wherein the number of acknowledgements is based upon said geographic distance relative to a predetermined distance.

16. The method of claim 13, wherein:
   the sending device comprises a set of sending devices including at least a first sending device located at a first geographic location and a second sending device located at a second geographic location different from the first geographic location;
   the receiving device dynamically transmits the set of acknowledgement packets as a single acknowledgement for every packet as that packet is received from the first sending device located at the first geographic location; and
   the receiving device dynamically transmits the set of acknowledgement packets as a single acknowledgement for a group of two or more packets as they are received from the second sending device located at the second geographic location.

* * * * *